Feb. 6, 1945.  F. HAUSER  2,368,832
AUTOMATIC VALVE
Filed April 8, 1942   5 Sheets-Sheet 1
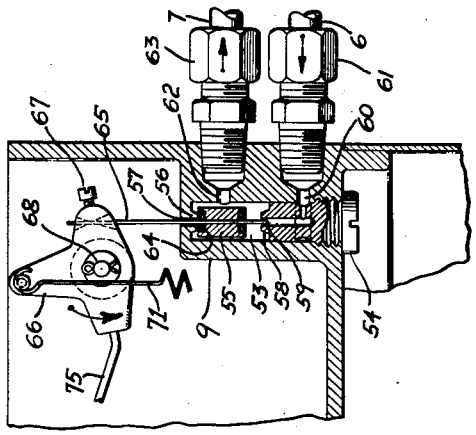
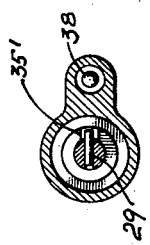
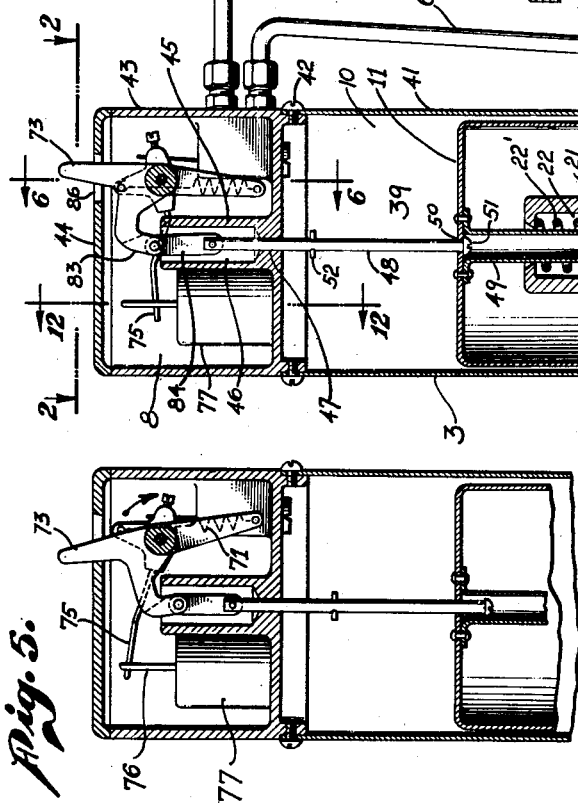
INVENTOR.
Fred Hauser

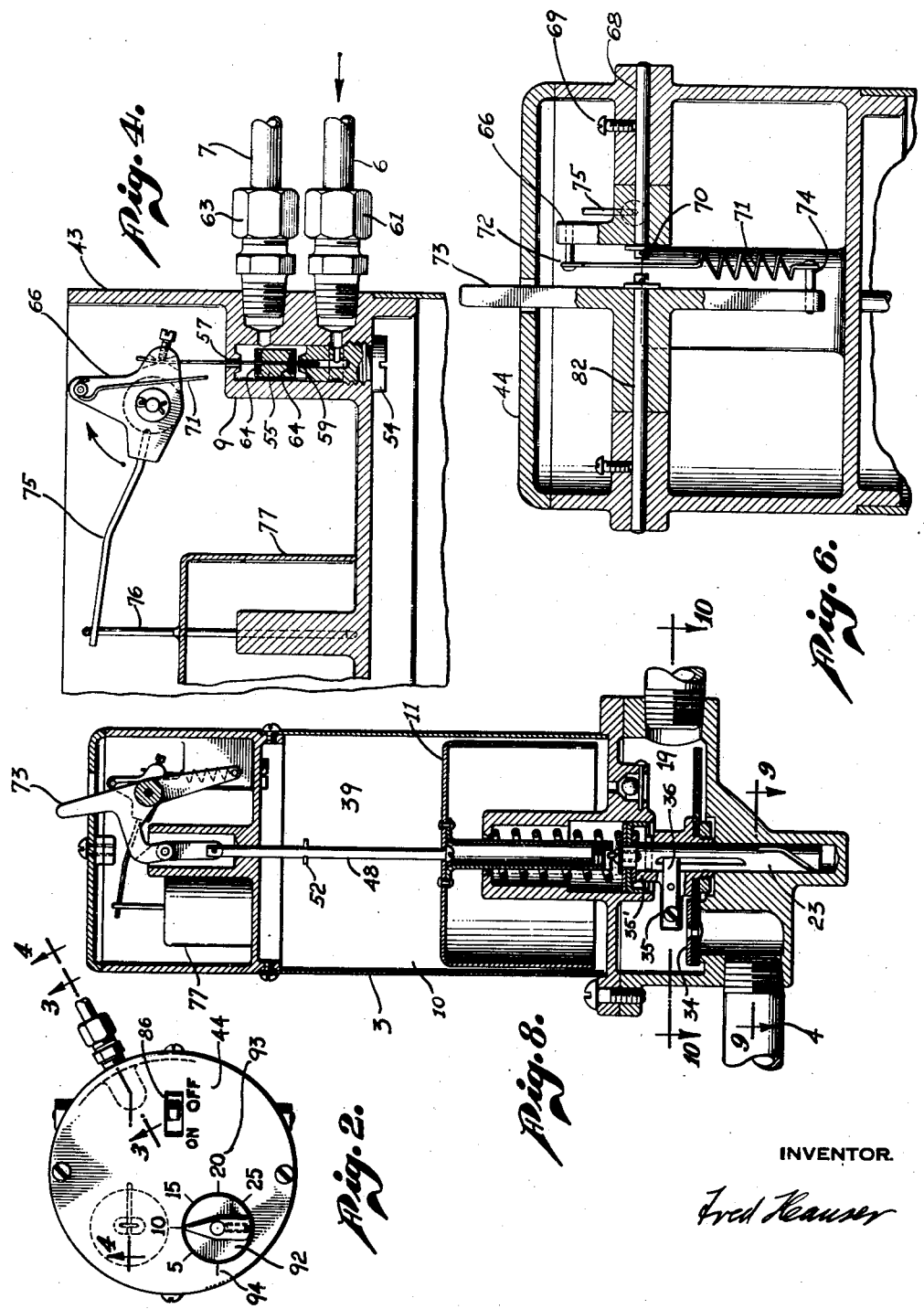

Feb. 6, 1945. F. HAUSER 2,368,832
AUTOMATIC VALVE
Filed April 8, 1942 5 Sheets-Sheet 3
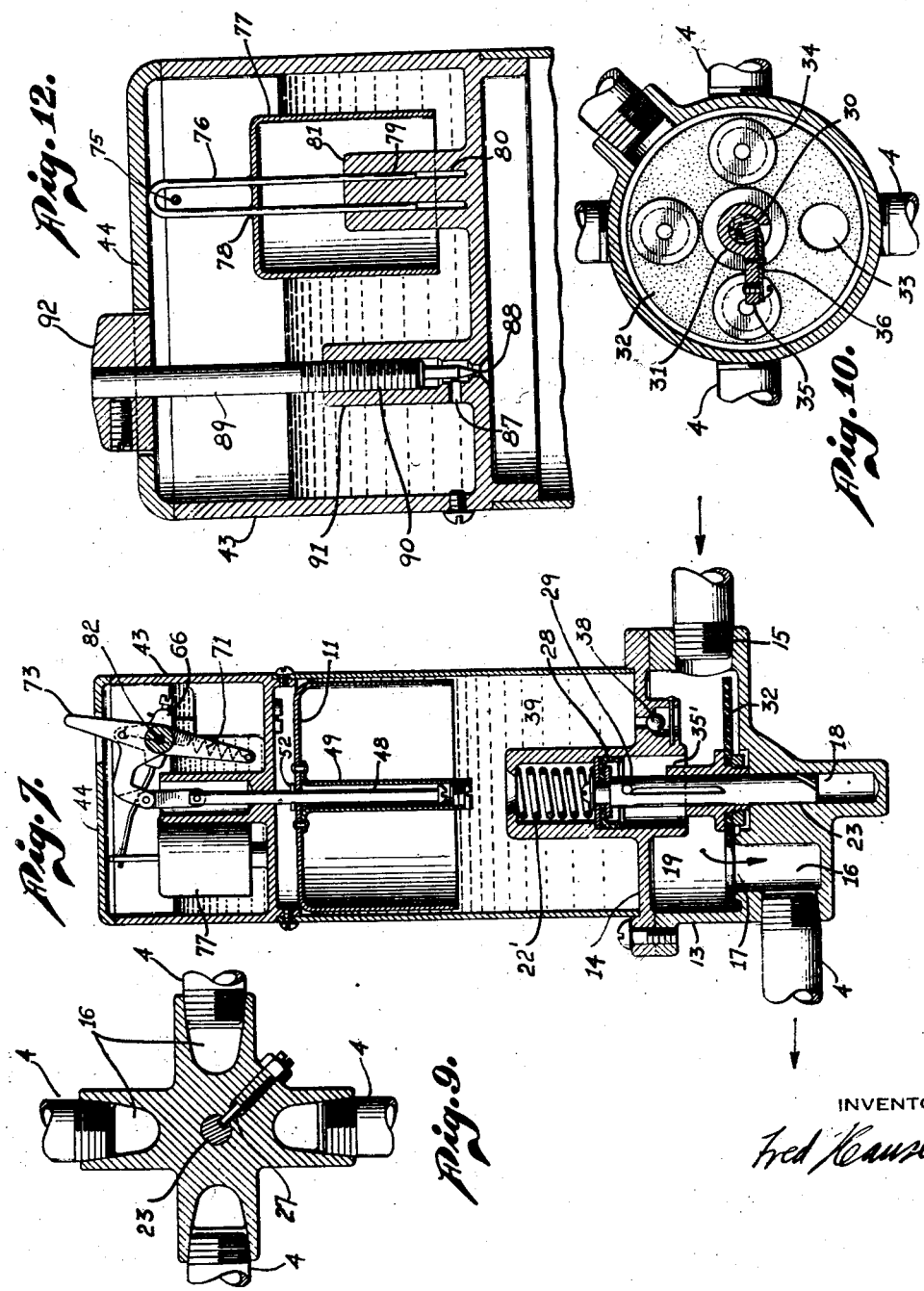
INVENTOR.
Fred Hauser Feb. 6, 1945. F. HAUSER 2,368,832
AUTOMATIC VALVE
Filed April 8, 1942 5 Sheets-Sheet 4
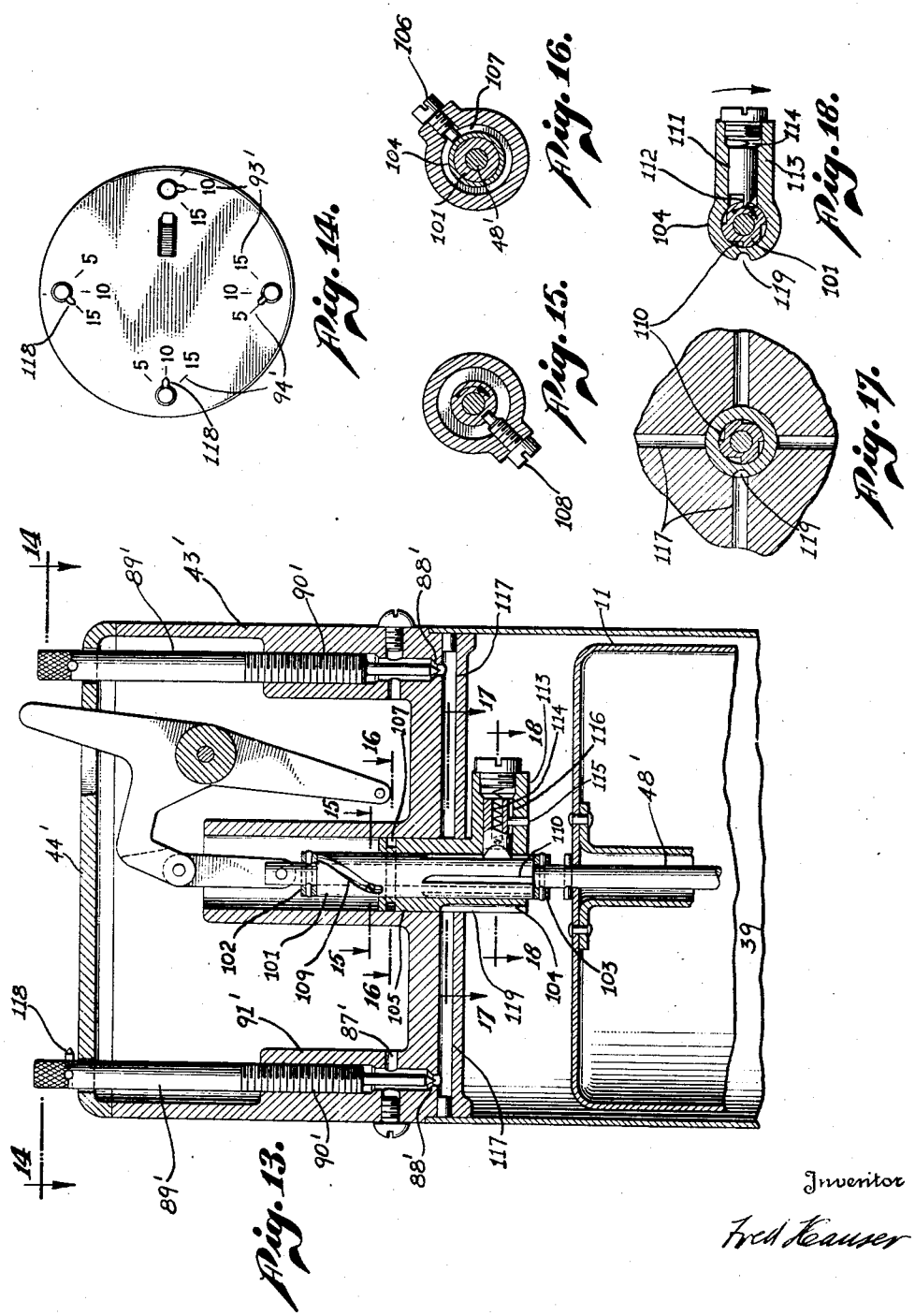
Inventor
Fred Hauser

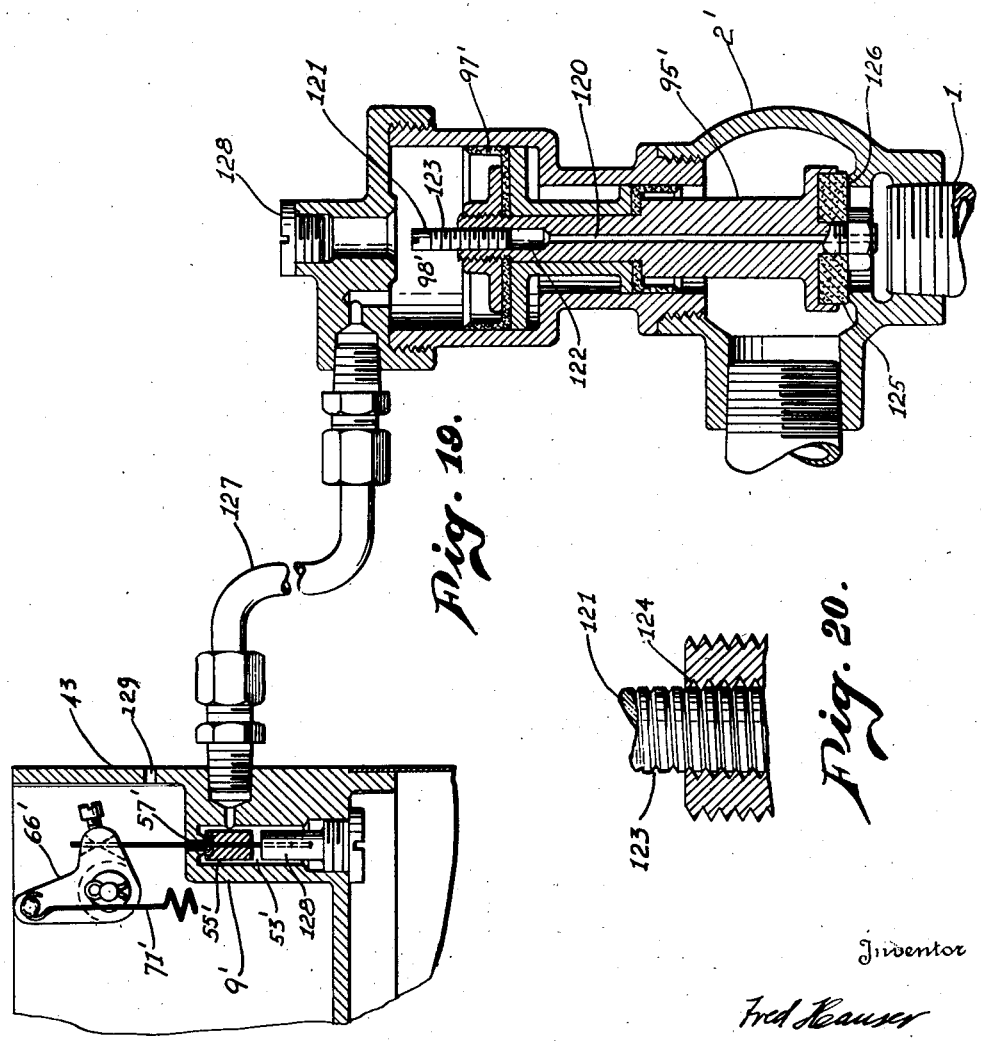

Patented Feb. 6, 1945

2,368,832

UNITED STATES PATENT OFFICE 2,368,832

AUTOMATIC VALVE

Fred Hauser, Los Angeles, Calif.

Application April 8, 1942, Serial No. 438,085

9 Claims. (Cl. 137—145)

This invention pertains to improvements in systems for sequential operation of sprinkler nozzles and is particularly directed to the automatic operation thereof. Sprinkling systems of this general type are most often used in irrigating lawns of private residences, parks, and orchards. They frequently consist of several groups of sprinkler nozzles, each group being connected to a branch pipe leading to the water main. The number and sizes of these nozzles in any one group depends upon the size of the water main and the hydrostatic pressure available. These groups are usually operated in sequence, there being never more than one group in operation at any one time. In the accompanying drawings four such groups are indicated, all four being connected to a central distributor valve.

A further object of the present invention is to provide a combination of elements whereby the time periods during which the sprinkler nozzles are in operation may be selectively chosen and pre-set by operating simple dials.

A still further object of the invention is to provide an improved distributor valve operated by the hydraulic pressure of the fluid which passes through it.

Other objects of this invention and the advantages thereof will be apparent from the following description of an illustrative embodiment of the invention. Reference will be made to the appended drawings, in which:

Fig. 1 is a vertical cross section through the control head and the main shut-off valve. A branch pipe on which is mounted a sprinkler nozzle is also indicated.

Fig. 2 is a plan view of the control head taken along the plane 2—2 of Fig. 1.

Fig. 3 is a section through the pilot valve located in the upper compartment of the control head, taken along the plane 3—3 of Fig. 2.

Fig. 4 is a section through the upper compartment of the control head, taken along the plane 4—4 of Fig. 2.

Fig. 5 is a section through the control head showing the starting lever and its associated parts in the position they occupy after the sprinkling operation has been manually initiated.

Fig. 6 is a vertical section taken along the plane 6—6 of Fig. 1.

Fig. 7 is a vertical cross section through the control head showing its mechanism in the position it occupies at the end of a sprinkling period.

Fig. 8 is a vertical cross section through the control head showing its mechanism in the position it occupies at the end of a dwell period.

Fig. 9 is a horizontal cross section taken along the plane 9—9 of Fig. 8.

Fig. 10 is a horizontal cross section taken along the plane 10—10 of Fig. 8.

Fig. 11 is a horizontal cross section taken along the plane 11—11 of Fig. 1.

Fig. 12 is a vertical cross section taken along the plane 12—12 of Fig. 1.

Fig. 13 is a vertical cross section through a modified form of a timing device.

Fig. 14 is a plane view of a modified form of a timing device taken along the plane 14—14 of Fig. 13.

Fig. 15 is a horizontal cross section taken along the plane 15—15 of Fig. 13.

Fig. 16 is a horizontal section taken along the plane 16—16 of Fig. 13.

Fig. 17 is a horizontal section taken along the plane 17—17 of Fig. 13.

Fig. 18 is a horizontal section taken along the plane 18—18 of Fig. 13.

Fig. 19 is a vertical cross section through a modified form of a main shut-off valve and part of a modified upper compartment of the control head.

Fig. 20 is a greatly enlarged sectional view of the leak screw and associated part situated in the top of the larger piston of the shut-off valve.

Referring to the drawings, I have illustrated my improved automatic sprinkling system in general form in Fig. 1. Water, from the water main 1, enters the main shut-off valve 2 which is attached to the control head 3. One of several branch pipes 4 is shown leading from the bottom of the control head 3 to a group of sprinkler nozzles, one of which is illustrated at 5. A tubing 6 connects the main 1 with the upper portion of the control head 3 and a tubing 7 leads from there to the main shut-off valve 2.

The control head 3 consists of three compartments. The upper compartment indicated at 8 contains the pilot or control valve 9 (Fig. 3) and the mechanism controlling its function. The central compartment 10 contains the main float 11, and the lower compartment 12 contains the distributor valve.

The distributor valve consists of the valve-housing 13 and the valve cover 14. The valve-housing 13 is provided with an inlet 15 and a number of outlets 16 (Figs. 1 and 9). In communication with the outlets 16 are the ports 17, spaced equally around the bore 18 located at the bottom of the valve chamber 19. Concentric with the bore 18 there is formed in the valve cover 14 a second bore 20 terminating at the shoulder 21 and then continuing at reduced size to form the spring chamber 22 containing the actuating spring 22'. The indexing shaft 23 is freely held in the bore 18. The lower end of the indexing shaft 23 is provided with a groove 24 consisting of a helical portion 25 and a straight portion 26. A pin 27 (Fig. 9) engages the groove 24 at all times. On the upper end of the indexing shaft 23 is mounted a cup leather or piston 28, and a short distance below it a stop pin 29 is securely pressed into said shaft. The middle section of the indexing shaft 23 has milled into it a series of longitudinal ratchet teeth 30, there being an equal number of ratchet teeth as there are ports 17. Loosely mounted on the ratchet shaft 23 is the valve-disc-holder 31 to which is secured the valve disk 32. This valve disc is made of a non-metallic material as, for instance, rubber. It is of circular shape and is provided with one orifice or opening 33 (Figs. 1 and 10) corresponding in size and location to one of the ports 17 positioned directly below it. The other areas of the valve disc 32 corresponding to the remaining ports 17 are reinforced by means of discs 34. The valve-disc-holder 31 carries a projection 35 (Figs. 8 and 10) to which is secured a leaf spring 36 which in turn engages the ratchet teeth 30 of the indexing shaft 23. Directly above the projection 35 there is located a second shorter projection 35', a plan view of which is shown in Fig. 11.

A check valve 37 containing a ball 38 connects the valve chamber 19 with the float chamber 39. A pin keeps the ball 38 in proper position within the check valve 37.

The float chamber 39 is formed by the cylinder 41 which is secured to the valve cover 14, preferably by soldering.

Attached to the top of the cylinder 41 by means of the screws 42 is the housing 43 provided with the cover 44. A hub 45 is formed in the center of the housing 43 and is provided with a large bore 46 and a smaller bore 47. Within the bore 47 there is mounted loosely the operating stem 48 which extends into the float chamber 39.

A float 11 is placed inside the float chamber 39 in such a manner that it can move up and down freely when water enters the chamber 39 and reaches a height in same to cause the float 11 to become buoyant. A tubular extension 49 is riveted on the inside of the float 11 and may extend into the spring chamber 22 where its sealed lower end may contact the upper end of the indexing shaft 23. The operating stem 48 protrudes through a hole 50 drilled in the top of the float 11, into the extension 49, and carries a screw 51 on its lower end and a pin 52 on its upper portion. The hole 50 is large enough to permit the float 11 to slide up and down freely on the operating stem 48, the pin 52 representing the highest position the float may occupy in relation to the stem 48.

In the housing 43 is located the pilot or control valve 9 (Fig. 3). The latter consists of the vertical bore 53, the screw 54 and the valve member 55. At the upper end of the bore 53 is formed the valve seat 56 around the bleeder port 57. The upper end of the screw 54 carries the valve seat 58 formed around the pressure port 59. This latter port is connected with the tubing 6 by means of a transverse inlet 60 and the fitting 61. The bore 53 is also in communication with the tubing 7 by means of an axial bore 62 and a fitting 63. The valve member 55 comprises a cylindrical body, provided on both ends with recesses in which are inserted the discs 64 made of non-metallic material, such as rubber. An actuating stem 65 is concentrically mounted in the valve member 55, preferably by soldering, and extends into the port 59 and through the port 57. This actuating stem 65 is considerably smaller in diameter than are either ports 56 or 59, thereby permitting water to flow through these ports around the stem 65. The upper end of the actuating stem 65 is securely held in the rocker arm 66 by means of the screw 67.

Fig. 6 illustrates the manner by which the rocker arm 66 is mounted in the housing 43. The axle 68 is held stationary by the retaining screw 69, and the rocker arm 66 may rock freely on the axle 68, being retained on same by the washer 70. A coil spring 71 is attached to the arm 66 at 72; the other end of the spring being fastened to the operating lever 73 at 74. The spring 71 is at all times under tension. The rocker arm 66 is also provided with an extension 75 (Fig. 4) which engages the looped rod 76 (Fig. 12) of the control float 77, the looped rod 76 being secured to the control float by soldering at 78. The lower portions 79 of the rod 76 also serve to guide the float in its up and down movement by reason of their sliding fit in the bores 80 drilled into an embossed portion 81 extending from the bottom of the housing 43.

Directly opposite the rocker arm 66 and mounted on an axle 82, which is concentric with the axle 68, is the operating lever 73. It, too, may rock freely, similar to the rocker arm 66. A hook-shaped extension 83 of the lever 73 (Fig. 1) carries at its extremity a link 84 which is also fastened to the operating stem 48. The operating lever 73 protrudes through the cover 44 at the elongated opening 86.

Water that may at times partially fill the housing 43 is being released slowly into the float chamber 39 through the bore 87 and the needle or timing valve 88 (Fig. 12), which is positioned in the bottom of the housing 43. The needle valve stem 89 is mounted by means of the thread 90 in the cylindrical boss 91 and also protrudes through the cover 44, where it is provided with a dial 92. Fig. 2 shows a plan view of this dial. A series of figures 93 and lines 94 cast on the top surface of the cover 44 indicate indirectly the amount of opening of the needle or timing valve 88. Actually the figures represent the number of minutes required for water contained in the housing 43 to flow through the needle or timing valve 88 and to fill the float chamber 39 to a height at which the float 11 contacts the pin 52 and elevates the operating stem 48 to a point where it will rock the operating lever 73 into a position illustrated in Fig. 7. This time interval represents the period during which one of the groups of sprinkler nozzles is in operation. The position of the dial 92 in Fig. 2 would, for example, indicate a sprinkling period of 10 minutes. If the thread 90 is a right hand thread, a rotation of the dial 92 in clock-wise direction would result in reducing the opening in the needle valve 88 through which the water may flow. This would produce an increased sprinkling period.

The main shut-off valve 2 (Fig. 1) is simply illustrative of one form of valve which may be employed, it being understood that other similar types of valves may be used. Generally stated, however, the valve 2 is of the differential pressure hydraulic type and includes a valve member 95 provided at its center portion with a small piston including the cup leather 96 and at its upper portion with a larger piston including the cup leather 97. The tubing 7 is connected to the chamber 98. The main valve body is provided with a pressure inlet at 99 and an outlet at 100.

Normally, when the sprinkling system is not in operation, the positions of the various moving parts within the control head 3 and the main shut-off valve 2 are as shown in Figs. 1, 2, and 3. Pressure fluid from the main 1 is supplied through the tubing 6 to the bore 53 of the pilot valve 9 (Fig. 3) and from there through the tubing 7 to the chamber 98 of the main shut-off valve 2. Such pressure fluid acting upon the large piston 97 presses the valve member 95 tightly against its valve seat, thereby cutting off the supply of pressure fluid from the valve inlet 99 to the valve outlet 100 and consequently to the valve chamber 19. The bleeder port 57 of the pilot valve is kept sealed due to the action of the spring 71 (Fig. 3) on the rocker arm 66. This spring 71 tends to rotate the rocker arm 66 in a direction shown by the arrow, thereby pulling the actuating stem 65 upward and effecting a water-tight seal between the bleeder port 57 and the disc 64 inserted in the upper end of the valve member 55. This position of the rocker-arm 66 and the valve member 55 is maintained all during the period the sprinkling system is not in operation.

The sprinkling operation is instituted by the operator by moving the operating lever 73 from its rest or "off" position as shown in Figs. 1 and 2 to the starting or "on" position as shown in Fig 5. In so doing, the spring 71, one end of which is fastened to the lower extension of the lever 73, is being moved to the right of the axis around which the rocker arm 66 oscillates, and rotates same in a direction indicated by the arrow in Fig. 5. The amount of this rotation is governed by the extension 75 as it contacts the looped rod 76 of the float 77. The size and weight of the float 77 is selected in such a manner that it will overcome the rotating action of the spring 71 and hold the rocker arm 66 and the valve member 55 in a position as shown in Fig. 4. In this position a small opening is left between the pressure port 59 and the lower disc 64 of the valve member 55. Pressure fluid from the chamber 98 of the main shut-off valve 2 is now released through the bleeder port 57 and empties into the housing 43. Such release of pressure causes the valve member 95 to rise and permits the pressure fluid from the main 1 to pass from the valve inlet 99 to the valve outlet 100 into the chamber 19 of the distributor valve 13, and from there through the orifice 33 and the port 17 into the branch pipe 4 and finally into the sprinkler nozzles 5. This marks the beginning of the sprinkling operation. The pressure in the valve chamber 19 also forces upward the piston 28 and the indexing shaft 23 attached to it, until stopped by the shoulder 21. The spring 22' is thereby compressed (Fig. 7). In its upward travel, the indexing shaft 23 is guided radially by the pin 27 (Fig. 9) engaging the groove 24. In the first part of the upward travel, corresponding to the straight portion 26 of the groove 24, the indexing shaft 23 travels only axially, that is, no rotation takes place. In the second part of its upward travel, however, the indexing shaft rotates as well, and in a counter-clockwise direction as indicated by the arrow in Fig. 10. This rotation is caused by the helical portion 25 of the groove 24. But the valve disc 32, and the valve-disc-holder 31 are held stationary by the pressure of the water upon the disc. Consequently the tooth 30 which had been engaging the leaf spring 36 previous to the beginning of the upward travel is now leaving same and upon termination of the upward travel, the succeeding tooth will engage the leaf spring 36. Also, the ball 38 is forced upward and seals the passage to the float chamber 39 (Fig. 7).

The pressure fluid entering the housing 43 from the chamber 98 of the main shut-off valve 2, and additional pressure fluid coming from the main 1 and passing through the tubing 6 and through the small opening left between the pressure port 59 and the valve member 55, is passing out of said housing through the needle valve 88 into the float chamber 39. But the rate at which the pressure fluid enters the housing 43 is faster than it can leave same through the needle valve 88, therefore causing the water level to rise. At a given height of the water-level the control float 77 becomes buoyant and rises (Fig. 12). This disengages the looped rod 76 from the extension 75 and permits the spring 71 to rotate further the rocker arm 66 in a direction as indicated by the arrow in Fig. 4, until the valve member 55 comes to rest on the pressure port 59, sealing same.

As the water level in the housing 43 drops below a given height the weight of the float 77 again opens the pressure port 59 and permits more pressure fluid to enter said housing.

The water thus accumulated in the housing 43 slowly passes through the needle valve 88 into the float chamber 39. The water level in the float chamber gradually rises, the main float 11 becomes buoyant, and as the water level approaches the top of the float chamber, the float 11 contacts the pin 52 and elevates the operating stem 48. This stem, being connected to the operating lever 73, causes the latter to revolve partially around its axle 82 (Fig. 7), swinging the spring 71 to the left past the center around which the rocker arm 66 oscillates. In so moving past the above mentioned center, the spring 71 will reach a position as shown in Fig. 7, at which position the spring causes the rocker arm 66 to snap suddenly into a position held previous to the initiating of the sprinkling operation and illustrated in Figs. 1 and 3. Fig. 3 also shows the position of the valve member 55 resulting from the above-mentioned new position of the rocker arm. The bleeder port 57 is now closed and the pressure port 59 is open. The pressure fluid from the main 1 may now again reach the chamber 98 of the main shut-off valve 2 and force the piston 97 downward, closing the valve and cutting off the supply of pressure fluid to the valve chamber 19 and the branch pipes 4. As the pressure in the chamber 19 drops, the spring 22', which had previously been compressed, forces downward the piston 28 and the indexing shaft 23. In its downward movement, the indexing shaft goes through the motion opposite to the one previously described when it moved upward. But this time the tooth 30 which engages the leaf spring 36 (Fig. 10) causes the valve-disc-holder 31 and the valve disc 32 to rotate with it. As the piston 28 reaches its lowermost position as illustrated in Fig. 8, the orifice 33 of the valve disc 32 comes to rest directly over the succeeding port 17 located at the bottom of the distributor valve.

As the pressure in the chamber 19 approaches atmospheric pressure the ball 38 of the check valve 37 drops, and the water that had accumulated in the float chamber 39 may pass through the check valve and reach the atmosphere through one of the branch pipes 4.

This terminates the first sprinkling cycle.

It is apparent that, as the water level drops, the float 11 descends in the float chamber 39. Before the float reaches its lowermost position, it contacts the screw 51 of the operating stem 48, carrying same downward and simultaneously tilting the operating lever 73 into the starting or "on" position as shown in Fig. 8.

This initiates the second sprinkling period, but this time the water enters another branch pipe 4, or more explicitly stated, it enters the branch pipe 4 which is connected to the port 17 which is at that time uncovered by the valve disc 32.

This above-described procedure automatically repeats itself until the last branch pipe 4 is supplied with pressure fluid; and finally the pressure fluid is cut off from same. As the float descends the last time it may not reach the lowermost position as it did in previous times, but instead it comes to rest considerably above it, and is held there by the top of the indexing shaft 23, which also occupies a position higher than in previous cycles. This new, higher position of the indexing shaft 23 is brought about by the stop pin 29 coming to rest on top of the projection 35' of the valve-disc-holder 31 as shown in Figs. 1 and 11.

At this position the operating stem 48 is not pulled down far enough by the float 11 to snap the rocker arm 66 into a position which may open the main shut-off valve 2; on the contrary, the rocker arm, the pilot valve, and the main shut-off valve maintain the positions as shown in Figs. 1 and 3.

It should be pointed out here that in its last downward stroke the indexing shaft did rotate sufficiently to index the valve disc 32 into a position it held before the sprinkling operation was manually started, that is, the opening 33 of the valve disc 32 comes to rest directly over the port 17 which connects with the first branch pipe 4. The pin 27 which engages the groove 24 of the indexing shaft 23 has just entered the lower part of the straight portion 26. The above-described position of the indexing shaft 23 and the valve disc 32 is so held during the period the sprinkling system is not in operation.

It is apparent from the foregoing description of the operation of the automatic sprinkling system that each branch pipe of the system will be supplied sequentially with pressure fluid, causing the sprinkler nozzles to operate. The time periods during which the sprinkler nozzles are in operation may be governed by the setting of the dial 92 as previously explained.

The dwell period, or the time interval elapsed between the operation of consecutive groups of sprinkler nozzles, is controlled by the time required for the water that had accumulated in the float chamber 39 during the sprinkling operation to drain through the check valve 37 into the branch pipes 4.

Figures 13 to 18 inclusive show a modified construction of the upper compartment of the control head 3, generally designated as 8'. It is desirable at times to have available different sprinkling periods for each group of sprinkler nozzles. For example: a portion of a lawn controlled by one of the groups of sprinkler nozzles may be in a shaded area, and may therefore require less water. Another portion, controlled by another group of sprinkler nozzles, may be situated on a sloping area where the water runs off quickly and may consequently require more water than a level portion.

The modified construction illustrates a device in which there are provided as many dials to control the duration of the sprinkling periods as there are groups of sprinkler nozzles. Each group may therefore be adjusted to a sprinkling period best suited to the conditions.

The operating stem 48' is provided at its upper end with an indexing cylinder 101 held axially in position by the two collars 102 and 103, but permitted to rotate freely on the stem 48'. An indexing sleeve 104, fitting freely over the cylinder 101 and also in the bore 105 of the housing 43' is held axially in a permanent position by means of the dog screw 106 (Fig. 16) engaging the circular groove 107. A similar dog screw 108 (Fig. 15) engages the helical groove 109 cut in the outer surface of the indexing cylinder 101 and causes same to rotate back and forth whenever the operating stem 48' moves up and down. The lower portion of the indexing cylinder 101 is provided with ratchet teeth 110 (Fig. 17 and 18), there being as many of same as there are groups of sprinkler nozzles. A plunger 111 provided with a tooth 112 is mounted in a projection 113 of the indexing sleeve 104. A coil spring 114 presses the plunger 111 at all times toward the indexing cylinder 101, and a pin 115 fitting in the groove 116 keeps the plunger from rotating.

Radially extending from the lower end of the bore 105 are a number of passages 117 (Figs. 13 and 17), there being as many such passages as there are ratchet teeth in the indexing cylinder 101. Connected with each of these passages 117 is a needle or timing valve 88' communicating with the inside of the housing 43' through the bore 87'. The needle valve stem 89' is mounted by means of the thread 90' in the appendage 91' of the housing 43' and protrudes through the cover 44', where a pointer 118 is pressed into same. The upper end of the needle valve stem 89' is knurled in order to provide a better grip for the operator's fingers. A series of figures 93' and lines 94' are cast on the top surface of the cover 44' and serve the same purpose as explained previously. A longitudinal groove 119 is milled into the lower half of the indexing sleeve 104 (Fig. 18) and is at all times in communication with one of the passages 117 whenever any sprinkling is taking place.

The rest of the mechanism enclosed in the housing 43' is identical with the one previously described as being enclosed in the corresponding housing 43.

During the dwell period, that is, the time interval between sprinkling operations of adjacent groups of sprinkler nozzles, the float 11 descends in the float chamber 39. A distance before it reaches the lowermost position the float 11 contacts the screw 51 and pulls the operating stem 48' downward, causing the indexing cylinder 101 to revolve in the direction indicated by the arrow in Figures 15 and 18. This revolving motion is brought about by the helical groove 109 being guided by the stationary dog screw 108. Since one of the ratchet teeth 110 engages the tooth 112 of the plunger 111, the indexing sleeve 104 also revolves with it (Fig. 18) and upon completion of the downward motion of the operating stem 48' the groove 119 comes to rest adjacent to the succeeding passage 117. Water from the inside of the housing 43' may then flow through the needle or timing valve 88' which is connected with the passage adjacent to the groove 119 and empty into the float chamber 39. The sprinkling operation then following will therefore be timed according to the setting of above-mentioned needle valve. As the float 11 approaches its top position and starts raising the operating stem 48', the indexing cylinder 101 revolves in a direction opposite to the one shown by arrow in Fig. 15, but this time it does not carry the indexing sleeve 104 with it, because the plunger 101 is being pushed backwards by the action of the ratchet teeth 110 against the backside of the tooth 112.

But as soon as the operating stem 48' descends again, the indexing sleeve 104 is once more rotated. In this manner the time interval during which each group of sprinkler nozzles operates is definitely dependent on the setting of its corresponding needle valve 88'.

Figures 19 and 20 illustrate a modified construction of a main shut-off valve designated as 2' and a pilot valve designated as 9'. The relative position of the main shut-off valve 2' to the fully assembled control head 3 is the same as shown in Fig. 1. Also the pilot valve 9' is positioned in the housing 43 similarly as is pilot valve 9 in the same housing.

The operation of these two modified units is as follows: Normally, when the sprinkling system is not in operation, pressure fluid from the main 1 enters the small bore 120 located in the valve member 95'. The leak screw 121 inserted in the top of the enlarged portion 122 of the bore 120 is shown in greatly enlarged form in Fig. 20. The thread 123 formed on the outside of the leak screw 121 is not cut to its full depth, while the mating thread formed in the bore 122 is cut to full depth. This leaves a triangular-shaped helical groove 124 open to the passage of pressure fluid along the entire length the leak screw 121 is engaged in its mating thread. The pressure fluid, therefore, may thus reach the chamber 98', and acting upon the large piston 97' press same and the valve member 95' downward, and forcing the non-metallic insert 125 tightly against the valve seat 126.

Pressure fluid from the chamber 98' may also pass through the tubing 127 into the bore 53' of the pilot valve 9'. The bleeder port 57' is kept sealed by the action of the spring 71' on the rocker arm 66' and ultimately on the valve member 55'. Full hydrostatic pressure is therefore maintained in the chamber 98'.

The sprinkling operation is instituted as described previously by moving the operating lever 73 (not shown in Fig. 19) to the "on" position. In so doing the rocker arm 66' is rotated in clockwise direction, thereby moving the valve member 55' downward until it contacts the screw 128 and opening the bleeder port 57' to the atmosphere.

It should be stated here that in this modified construction no control float 77 is used, and the bleeder port 57' remains fully open during the entire period the sprinkling system is in operation.

As soon as the bleeder port 57' is thus opened, the pressure fluid from the chamber 98' may reach the atmosphere. It should be noted here that the size of the bleeder port 57' is so proportioned in relation to the size of the helical groove 124 around the leak screw 121 that the rate at which the pressure fluid may enter the chamber 98' through the helical groove is much slower than the rate at which it may leave said chamber through the bleeder port 57'. Stated in another form: The resistance offered to the flow of pressure fluid through the helical groove 124 is many times greater than the resistance offered by the bleeder port 57' to said flow. It follows then that as soon as the bleeder port 57' opens, the pressure in the chamber 98' is reduced to nearly atmospheric pressure, and the valve member 95' rises and permits pressure fluid from the main 1 to pass into the distributor valve 13, thus starting the sprinkling operation.

During the entire period the sprinkling system is in operation, pressure fluid from the main 1 continues to pass through the bore 120 and into the housing 43.

By removing the capping screw 128 access is had to the leak screw 121 and same may be adjusted in such a manner that the length of the helical groove 124 is increased or decreased, thus decreasing or increasing the rate of flow of pressure fluid into the housing 43.

It is proposed to use the needle valve 88 as shown in Fig. 12 in connection with the here-described modified construction, said needle valve functioning identically as previously described.

The leak screw 121 is originally adjusted in such a manner that the rate of flow of water into the housing 43 is at all times greater than the rate of flow through the needle valve 88. The excess water empties out of the housing 43 through the port 129.

At the end of each sprinkling cycle the valve member 55' returns to the position shown in Fig. 19, closing the bleeder port 57'. Thus full hydrostatic pressure is slowly reestablished in the chamber 98' and the valve member 95' moves downward and closes the shut-off valve 2'.

It is obvious that while the above-described modified construction is simpler in that it eliminates the control float 77 and the tubing 6 (Fig. 1), it results in a wastage of water, namely the water that passes through the port 129. In the majority of installations, however, this is not objectionable.

Attention is called to the fact that the means for timing the sprinkling periods consists of releasing water of very low head or pressure through an adjustable orifice. This low pressure permits a much larger orifice or opening than would be possible if water were to be released, as is sometimes done in similar devices, at the pressure existing in the water main. A larger orifice is not affected by corrosion or by minute dirt particles to the extent that a smaller orifice would be. The timing is consequently more accurate.

All such changes, modifications, and adaptations as come within the scope of the appended claims are embraced thereby.

Having thus described my invention, I claim:

1. In a system for sequential release of pressure fluid: a supply valve in communication with a source of pressure fluid; a distributor valve comprising a chamber in communication with said supply valve and provided with a plurality of service outlets; a rotary member within said chamber constructed and arranged on rotation to sequentially establish communication between said service outlets and said chamber; indexing means within said chamber for actuating the rotary member each time said supply valve closes to a position establishing communication between said chamber and the next service outlet of the sequence; a control valve associated with said supply valve for opening and closing said supply valve to permit pressure fluid to flow from said source to said distributor valve chamber; and hydraulic actuating means for periodically operating said control valve.

2. In a system for sequential release of pressure fluid: a distributor valve comprising a chamber and a plurality of service outlets; a conduit communicating said chamber with a source of pressure fluid, a supply valve in said conduit biased to open position by pressure in the conduit, said valve including a valve member connected to an actuating piston enclosed in a pressure chamber in which pressure acts on the piston to hold the valve closed, a manually adjustable restricted orifice carried by the movable valve member and communicating the source of pressure fluid with said chamber; a rotary member within the chamber of the distributor valve, said rotary member being constructed and arranged on rotation to sequentially establish communication between said service outlets and said chamber; indexing means within said chamber for actuating the rotary member each time said supply valve closes to a position establishing communication between said chamber and the next service outlet of the sequence; and control means including a float chamber, a timing float operable in said float chamber, a storage compartment in communication with said float chamber and a control valve having a first position establishing communication between the pressure chamber and the storage compartment effective to bleed the pressure from said pressure chamber and a second position interrupting said communication, said control valve being moved to said second position when the float is raised to a predetermined level and moved to its first position on lowering of the float; an adjustable timing valve between said storage compartment and said float chamber, and a check valve permitting pressure fluid within said float chamber to be discharged whenever said supply valve is closed.

3. In a system for sequential release of pressure fluid: a distributor valve comprising a chamber and a plurality of service outlets; a conduit communicating said chamber with the source of pressure fluid, a supply valve in said conduit; a rotary member within the chamber of said distributor valve, said rotary member being constructed and arranged on rotation to sequentially establish communication between said service outlets and said chamber, a cylinder in said chamber, a piston in said cylinder arranged to be moved in one direction by pressure in said chamber, spring means biasing the piston in the opposite direction, said spring means being incapable of preventing movement of the piston by pressure in the chamber due to opening of the supply valve, means actuated by movement of the piston for indexing said rotary member each time said supply valve closes to a position establishing communication between said chamber and the next outlet of the sequence; and control means including a control valve and a float chamber, a timing float operable within said chamber and arranged to actuate said control valve to control the opening and closing function of said supply valve to permit pressure fluid to flow from said source to said distributor chamber.

4. In a system for sequential release of pressure fluid: a distributor valve comprising a chamber and a plurality of service outlets, a conduit communicating said chamber with a source of pressure fluid, a supply valve provided with hydraulic operating means in said conduit; a rotary member, and a piston within said distributor valve chamber, said piston being arranged to be operated in one direction by pressure fluid within said chamber resulting from the opening of said supply valve and biased in the opposite direction by a spring, means actuated by movement of the piston in the opposite direction for indexing said rotary member each time said supply valve closes to a position establishing communication between said chamber and the next service outlet of the sequence; and control means associated with said source of pressure fluid and with said hydraulic operating means for periodically opening and closing said supply valve to permit pressure fluid to flow from said source to said distributor valve chamber and to said service outlets.

5. In a system for sequential release of pressure fluid: a distributor valve comprising a chamber and a group of service outlets; a conduit communicating said chamber with a source of pressure fluid, a supply valve in said conduit, a rotary member and indexing means within said chamber, said indexing means being constructed and arranged to actuate said rotary member each time said supply valve closes to a position establishing communication between said chamber and the next service outlet of said group; a control valve associated with said supply valve for opening and closing said supply valve to permit pressure fluid to flow from said source to said distributor valve chamber; and hydraulic actuating and hydraulic timing means for periodically operating said control valve.

6. In a system for sequential release of pressure fluid: a distributor valve comprising a chamber and a plurality of service outlets; a conduit communicating said chamber with a source of pressure fluid, a supply valve in said conduit biased to open position by pressure in the conduit, said valve including a valve member connected to an actuating piston enclosed in a pressure chamber in which pressure acts on the piston to hold the valve closed; a rotary member within the chamber of the distributor valve, said rotary member being constructed and arranged on rotation to sequentially establish communication between said service outlets and said chamber; indexing means within said chamber for actuating said rotary member each time said supply valve closes to a position establishing communication between said chamber and the next service outlet of the sequence; and control means including a float chamber, a timing float operable in said float chamber, a storage compartment in communication with said float chamber and a control valve having a first position establishing communication between the pressure chamber and the storage compartment effective to bleed the pressure from said pressure chamber and a second position establishing communication between the pressure chamber and the source of pressure fluid, said control valve being moved to said second position when the float is raised to a predetermined level and moved to its first position on lowering of the float; an adjustable timing valve between said storage compartment and said float chamber, and a check valve permitting pressure fluid within said float chamber to be discharged whenever said supply valve is closed; said supply valve being adapted to close when said pressure chamber is in communication with said source of pressure fluid, and to open when said pressure chamber is in communication with said storage compartment and thereby permitting pressure fluid to flow from said source to said distributor valve chamber.

7. In a system for sequential release of pressure fluid: a supply valve in communication with a source of pressure fluid and provided with hydraulic operating means, a distributor valve comprising a chamber in communication with said supply valve and provided with a plurality of service outlets, a rotary member within said chamber, constructed and arranged on rotation for sequentially establishing communication between said service outlets and said chamber, indexing means within said chamber constructed and arranged to actuate said rotary member each time said supply valve closes to a position establishing communication between said chamber and the next service outlet of the sequence, and control means including a float chamber, a timing float operable within said float chamber, a storage compartment, a control valve constructed and arranged to be actuated by said timing float to establish communication between either said source of pressure fluid and said hydraulic operating means or between said hydraulic operating means and said storage compartment, an adjustable timing valve permitting fluid from said storage compartment to enter said float chamber and to elevate said timing float, and to actuate said control valve to establish communication between said source of pressure fluid and said hydraulic operating means, a check valve permitting the fluid within said float chamber to leave the latter whenever said supply valve is closed and to lower said timing float and to actuate said control valve to establish communication between said hydraulic operating means and said storage compartment, said supply valve opening or closing when said hydraulic operating means is in communication with said storage compartment or with said source of fluid supply respectively.

8. In a system for sequential release of pressure fluid: a supply valve in communication with a source of pressure fluid and provided with hydraulic operating means, a distributor valve comprising a chamber in communication with said supply valve and provided with a plurality of service outlets, a rotary member within said chamber, constructed and arranged on rotation for sequentially establishing communication between said service outlets and said chamber, indexing means within said chamber constructed and arranged to actuate said rotary member each time said supply valve closes to a position establishing communication between said chamber and the next service valve of the sequence; and control means including a storage compartment, a control float within the latter, a float chamber, a timing float operable within said float chamber, an adjustable timing valve constructed to establish communication between said storage compartment and said float chamber, a control valve positioned partly by said timing float and partly by said control float, the latter being constructed and arranged to establish communication between said hydraulic operating means and either said source of pressure fluid or said storage compartment, said control float being arranged to govern the flow of pressure fluid from the source of fluid supply to said storage compartment and thereby maintaining a definite fluid level in said storage compartment when the system is in operation, said supply valve closing whenever full communication between said hydraulic operating means and the source of pressure fluid is established and opening whenever communication between said hydraulic operating means and said storage compartment is established, and thereby permitting pressure fluid to flow from said source to said distributor valve chamber.

9. In a system for sequential release of pressure fluid: a distributor valve comprising a chamber and a plurality of service outlets, a conduit communicating said chamber with a source of pressure fluid, a supply valve in said conduit; a rotary member and a cylinder within said chamber, a piston and a spring within said cylinder, said piston being arranged to be actuated in one direction by the presence of pressure fluid in said chamber due to the opening of the supply valve and biased in the opposite direction by said spring means, means actuated by movement of said piston in the opposite direction for indexing said rotary member each time said supply valve closes, to a position establishing communication between said chamber and the next service outlet of the sequence; and a control valve associated with said supply valve for opening and closing said supply valve to permit pressure fluid to flow from said source to said distributor valve chamber; and hydraulic actuating means for periodically operating said control valve, and adjustable hydraulic timing means for controlling the operating cycles of said actuating means.

FRED HAUSER.